(12) United States Patent
Takita et al.

(10) Patent No.: US 8,705,959 B2
(45) Date of Patent: Apr. 22, 2014

(54) OPTICAL NETWORK DESIGNING DEVICE, METHOD, AND PROGRAM

(75) Inventors: Yutaka Takita, Kawasaki (JP); Tomohiro Hashiguchi, Kawasaki (JP); Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 529 days.

(21) Appl. No.: 13/049,058

(22) Filed: Mar. 16, 2011

(65) Prior Publication Data
US 2011/0229134 A1 Sep. 22, 2011

(30) Foreign Application Priority Data

Mar. 18, 2010 (JP) .................................. 2010-62062

(51) Int. Cl.
*H04J 14/00* (2006.01)
(52) U.S. Cl.
USPC .................. 398/45; 398/58; 398/66; 398/165; 370/254; 370/252
(58) Field of Classification Search
USPC ............... 398/45–73, 165–168; 370/254, 400
See application file for complete search history.

(56) References Cited

U.S. PATENT DOCUMENTS

2007/0189191 A1\* 8/2007 Ades .............................. 370/254

FOREIGN PATENT DOCUMENTS

| JP | 2005-86675 | 3/2005 |
|---|---|---|
| JP | 2006-67067 | 3/2006 |
| JP | 2006-270460 A | 10/2006 |

OTHER PUBLICATIONS

Japanese Office Action mailed Sep. 17, 2013 for corresponding to Japanese Application No. 2010-062062, with Partial English-language Translation.

\* cited by examiner

*Primary Examiner* — Li Liu
(74) *Attorney, Agent, or Firm* — Fujitsu Patent Center

(57) ABSTRACT

An optical network designing device that designs a path of an optical network that includes an asymmetric optical hub site, comprising: a path calculating unit that calculates a requested traffic path without a limit to a number of connections of the asymmetric optical hub site; a violation determining unit that determines whether a limit to the number of connections is violated in the asymmetric optical hub site through which the traffic path calculated by the path calculating unit passes; a removal selecting unit that selects a removal connection to be removed from the determined asymmetric optical hub site when the violation determining unit determines that the limit to the number of connections is violated; and a path recalculating unit that recalculates a traffic path that passes through the asymmetric optical hub site from which the removal connection selected by the removal selecting unit has been removed.

11 Claims, 19 Drawing Sheets

FIG. 6

| PORT | NUMBER OF CONNECTIONS OF PORT | ADDITIONAL CONNECTION FLAG | PX_ADD | EXCESS CONNECTION FLAG | PX_OVER |
|---|---|---|---|---|---|
| P0 | 6 | NO | P1_ADD = 0 ( : 6-4 > 0) | OVER | P0_OVER = 2 ( = 6-4 > 0) |
| P1 | 1 | YES | P2_ADD = 3 ( : 1-4 < 0) | NO | P1_OVER = 0 ( : 1-4 =< 0) |
| P2 | 4 | NO | P3_ADD = 0 ( : 4-4 = 0) | NO | P2_OVER = 0 ( : 4-4 = 0) |
| P3 | 3 | YES | P4_ADD = 1 ( : 3-4 < 0) | NO | P3_OVER = 0 ( : 3-4 =< 0) |
| P4 | 1 | YES | P5_ADD = 3 ( : 1-4 < 0) | NO | P4_OVER = 0 ( : 1-4 =< 0) |
| P5 | 5 | NO | P6_ADD = 0 ( : 5-4 > 0) | OVER | P5_OVER = 1 ( = 5-4 > 0) |
| P6 | 2 | YES | P7_ADD = 2 ( : 2-4 < 0) | NO | P6_OVER = 0 ( : 2-4 =< 0) |
| P7 | 2 | YES | P8_ADD = 2 ( : 2-4 < 0) | NO | P7_OVER = 0 ( : 2-4 =< 0) |

48

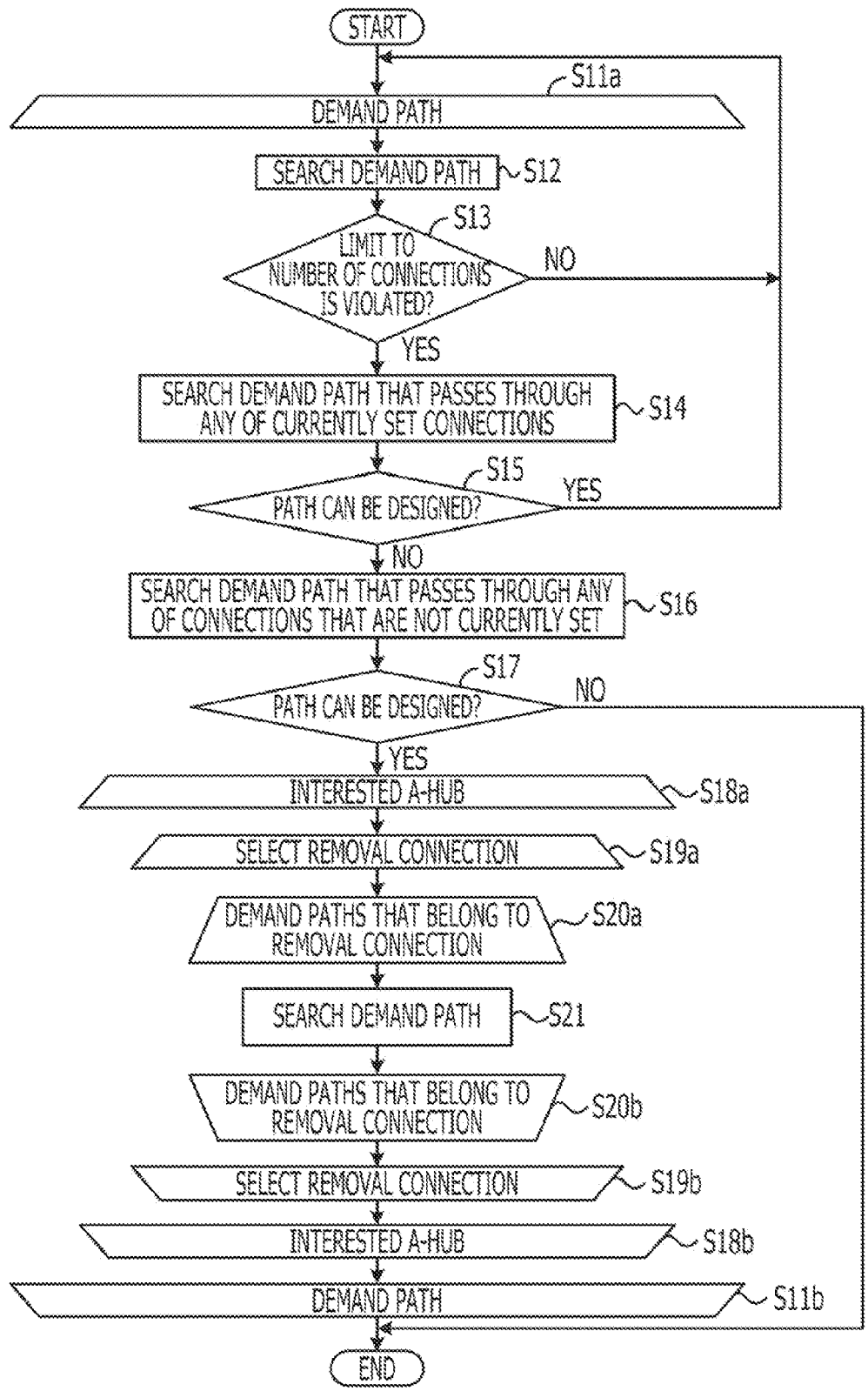

FIG. 15

| DESIGNING METHOD | | DESIGN OF PATH WITHOUT CONSIDERATION OF VIOLATION OF LIMIT TO NUMBER OF CONNECTIONS AND SELECTION OF REMOVAL CONNECTION | DESIGN IN CONSIDERATION OF VIOLATION OF LIMIT TO NUMBER OF CONNECTIONS FOR EACH OF DEMAND PATHS |
|---|---|---|---|
| NUMBER OF CALCULATIONS TO SEARCH PATH | NUMBER OF CALCULATIONS FOR DEMAND PATH SETTING | D | $3 \times D$ |
| | NUMBER OF CALCULATIONS WITH ADJUSTMENT OF CONNECTIONS | $N \times C_{new} \times D_{Crew}$ | $D \times N \times C_{old} \times D_{Cold}$ |

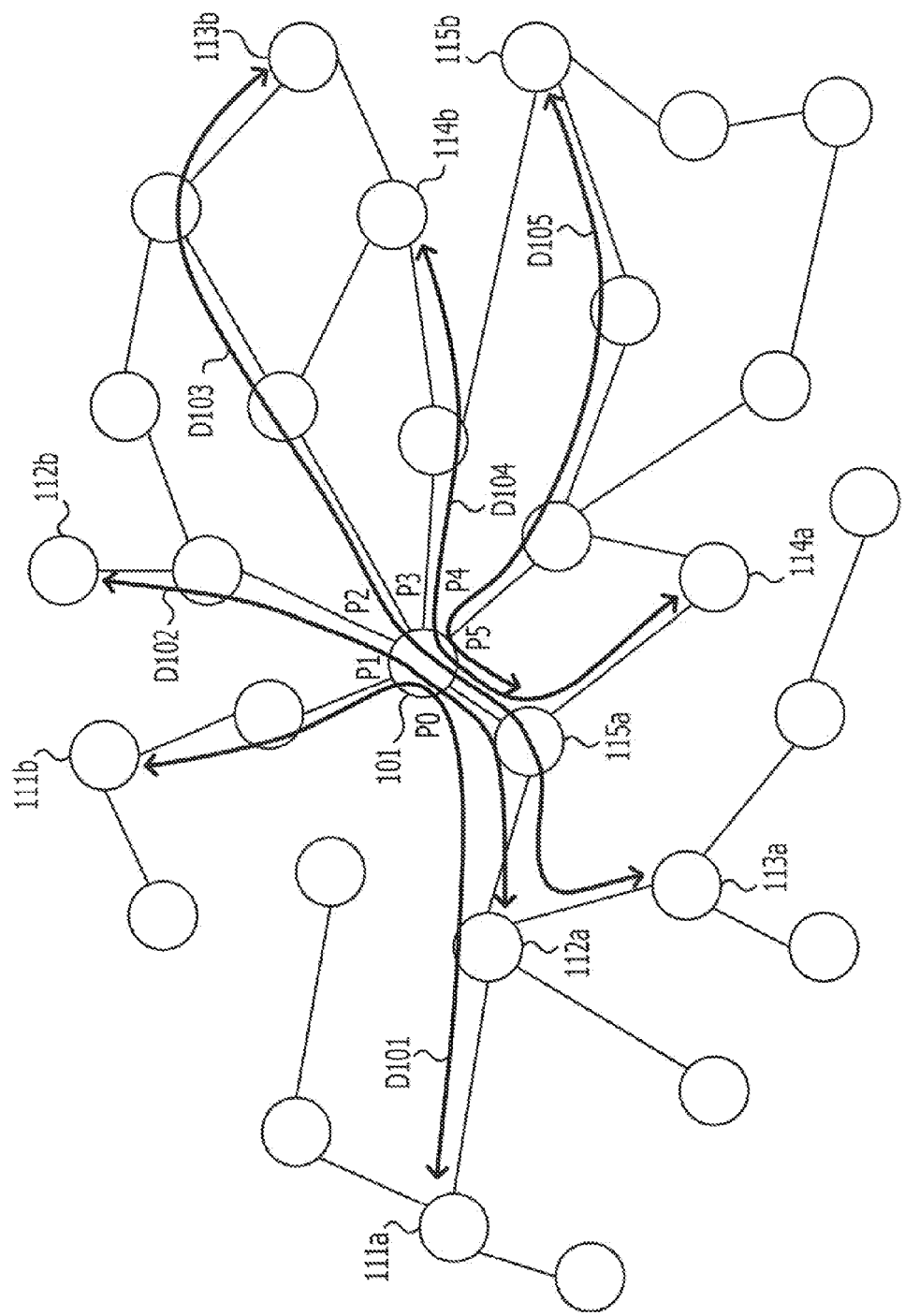

OPTICAL NETWORK DESIGNING DEVICE, METHOD, AND PROGRAM

CROSS-REFERENCE TO RELATED APPLICATION

This application is based upon and claims the benefit of priority from the prior Japanese Patent Application No. 2010-62062 filed on Mar. 18, 2010, the entire contents of which are incorporated herein by reference.

FIELD

The embodiments relate to an optical network designing device, an optical network designing method and an optical network designing program, which allow a path of an optical network to be designed.

BACKGROUND

In recent years, optical hub sites such as an optical add-drop multiplexer (OADM) and a wavelength cross connect (WXC) have been developed in the optical network field. The OADM adds and drops an optical signal on a wavelength basis. The WXC switches a path of an optical signal on a wavelength basis. The optical hub sites allow an optical network with a complex topology such as mutually coupled links or a mesh structure to be built. The sizes of networks have increased.

As a conventional technique, an optical network designing method has been proposed, which is to reliably calculate a currently used optical path and an auxiliary optical path at a high speed in an optical network in which a plurality of optical transfer links share a single optical transfer device so that the network cost is minimized (for example, refer to Japanese Unexamined Patent Application Publication No. 2006-67067).

As another conventional technique, an optical network designing method has been proposed, which is to design an optical network that is tolerant of a variation in traffic (for example, refer to Japanese Unexamined Patent Application Publication No. 2005-86675).

SUMMARY

According to an aspect of the invention, an optical network designing device that designs a path of an optical network that includes an asymmetric optical hub site, comprising: a path calculating unit that calculates a requested traffic path without a limit to a number of connections of the asymmetric optical hub site; a violation determining unit that determines whether a limit to the number of connections is violated in the asymmetric optical hub site through which the traffic path calculated by the path calculating unit passes; a removal selecting unit that selects a removal connection to be removed from the determined asymmetric optical hub site when the violation determining unit determines that the limit to the number of connections is violated; and a path recalculating unit that recalculates a traffic path that passes through the asymmetric optical hub site from which the removal connection selected by the removal selecting unit has been removed.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of the configuration of data stored in an A-Hub information storage unit.

FIG. 14 is a flowchart illustrating another operational example of the optical network designing device.

FIG. 15 is a diagram illustrating a comparison of the numbers of calculations to search paths.

FIG. 16 is a diagram illustrating a first example of path design of an optical network designing device.

DESCRIPTION OF EMBODIMENTS

Figure 1:
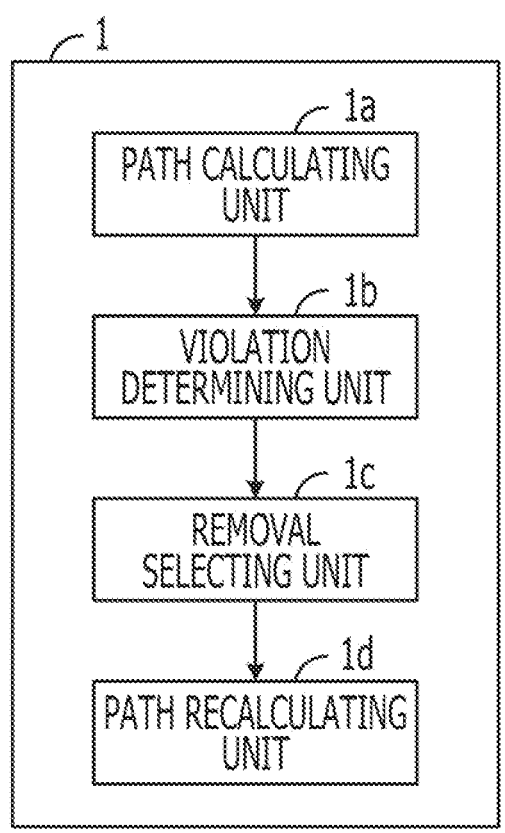
FIG. 1 is a diagram illustrating an optical network designing device according to a first embodiment.

The number of connections between ports of an optical hub site that forms an optical network is limited depending on the cost of producing the optical hub site in some cases. Thus, an optical network designing device that designs paths of an optical network may not design an appropriate path due to an increase in the size of the optical network and obtain appropriate design results in some cases.

FIG. 16 is a diagram illustrating a first example of the path design of the optical network designing device. In FIG. 16, an optical network is illustrated. The optical network includes optical hub sites 101, 111a to 115a and 111b to 115b and other multiple optical hub sites indicated by circles. The optical hub site 101 has ports P0 to P5. The other optical hub sites each have at least one port.

The optical network designing device has stored therein information on a topology of optical hub sites that form an optical network. For example, the optical network designing device has stored therein information on a topology of the optical hub sites illustrated in FIG. 16.

The optical network designing device references the topology information on the basis of a path selection method such as Dijkstra's algorithm and designs (calculates) a traffic path (hereinafter also referred to as a demand path) extending from a certain optical hub site to another optical hub site in response to a request from an operator.

For example, it is assumed that the optical network designing device is requested by the operator to calculate a demand path extending from the optical hub site 111a serving as a start point to the optical hub site 111b serving as an end point, a demand path extending from the optical hub site 112a serving as a start point to the optical hub site 112b serving as an end point, . . . , and a demand path extending from the optical hub site 115a serving as a start point to the optical hub site 115b serving as an end point. In this assumption, the optical network designing device calculates paths D101 to D105 illustrated in FIG. 16, for example.

Figure 17:
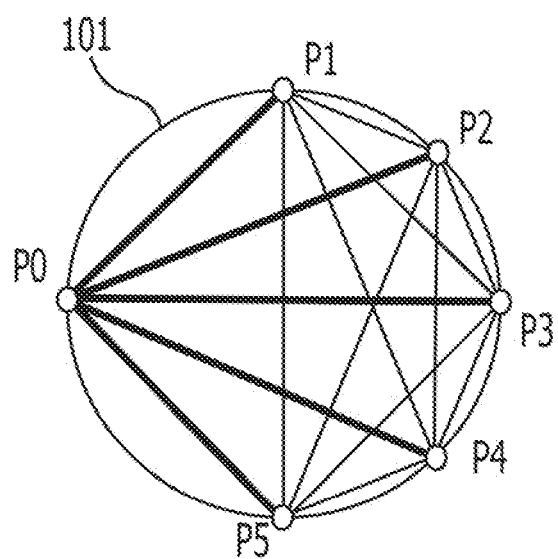
FIG. 17 is a diagram illustrating a second example of the path design of the optical network designing device.

FIG. 17 is a diagram illustrating a second example of the path design of the optical network designing device. In FIG. 17, the optical hub site 101 illustrated in FIG. 16 is illustrated. The ports P0 to P5 of the optical hub site 101 illustrated in FIG. 17 each do not have a limit to the number of connections. Specifically, each of the ports P0 to P5 can be coupled to the other ports so that a full mesh is configured as illustrated in FIG. 17.

It is assumed that the optical network designing device calculates the same demand paths as in FIG. 16. In this assumption, since the ports P0 to P5 of the optical hub site 101 each do not have a limit to the number of connections, connections between the port P0 and ports P1 to P5 can be set when the optical network designing device calculates paths that extend through the optical hub site 101. Thus, the optical network designing device can calculate the demand paths requested by the operator.

Figure 18:
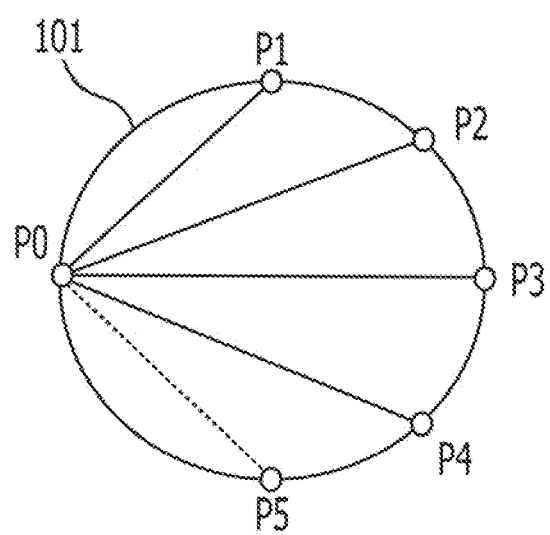
FIG. 18 is a diagram illustrating a third example of the path design of the optical network designing device.

FIG. 18 is a diagram illustrating a third example of the path design of the optical network designing device. In FIG. 18, the optical hub site 101 illustrated in FIG. 16 is illustrated. It is assumed that the number of connections is limited to four in the optical hub site 101 illustrated in FIG. 18. An optical hub site in which the numbers of connections between ports are limited is called an asymmetric optical hub site. The optical hub site 101 illustrated in FIG. 18 is an asymmetric optical hub site.

It is assumed that the optical network designing device calculates the same demand paths as in illustrated in FIG. 16. In this assumption, since the number of connections is limited to four in the optical hub site 101, a connection between the port P0 and any of the ports P1 to P5 cannot be set when the optical network designing device calculates paths that extend through the optical hub site 101. Thus, the optical network designing device cannot calculate the demand paths requested by the operator.

For example, the optical network designing device calculates the demand path that extends from the optical hub site 111a to the optical hub site 111b. In this case, it is assumed that the optical network designing device sets a connection between the ports P0 and P1 in the optical hub site 101. In the same manner, the optical network designing device calculates the demand path that extends from the optical hub site 114a to the optical hub site 114b. In this case, it is assumed that the optical network designing device sets a connection between the ports P0 and P4 in the optical hub site 101.

Next, the optical network designing device calculates the demand path that extends from the optical hub site 115a to the optical hub site 115b. In this case, the optical network designing device tries to set a connection between the ports P0 and P5 in the optical hub site 101. However, since the number of connections of the port P0 exceeds four, the connection between the ports P0 and P5 cannot be set. Thus, the optical network designing device cannot calculate the demand path requested by the operator.

Figure 19:
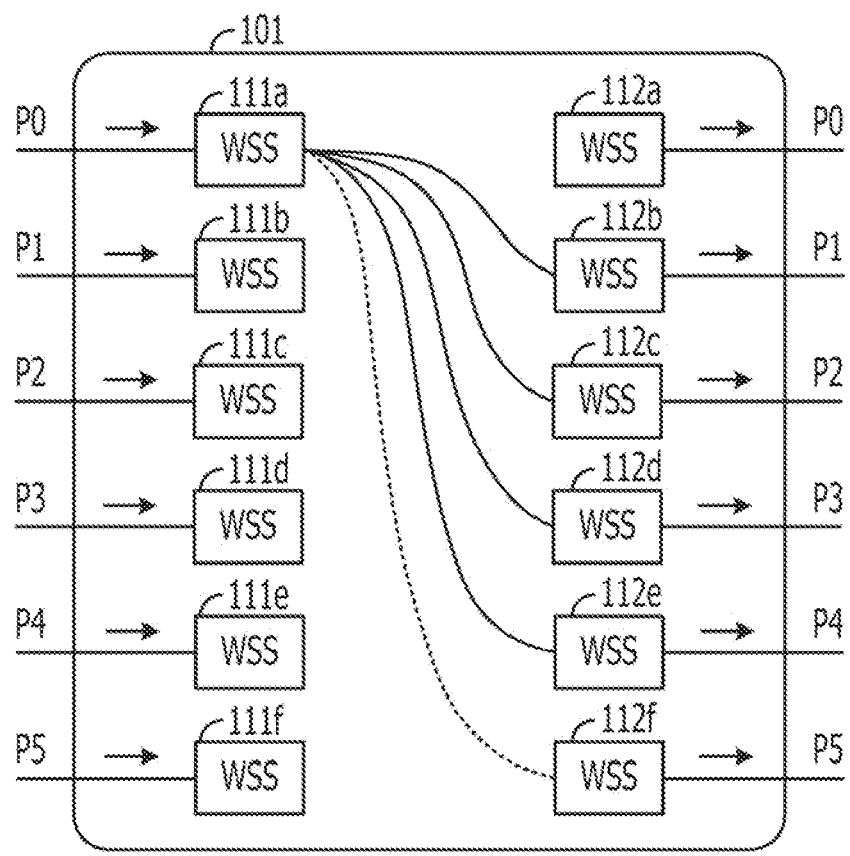
FIG. 19 is a diagram illustrating a detailed example of an optical hub site.

FIG. 19 is a diagram illustrating a detailed example of the optical hub site. As illustrated in FIG. 19, the optical hub site 101 has wavelength selective switches (WSSs) 111a to 111f and 112a to 112f. The optical hub site 101 is arranged in a rack, for example. Boards of the WSSs 111a to 111f and 112a to 112f are placed on shelves of the rack.

The ports P0 to P5 illustrated in FIG. 19 correspond to the ports P0 to P5 illustrated in FIGS. 16 to 18. In FIG. 19, although the ports P0 to P5 are each indicated by two symbols, the two symbols indicate an input and output of the port.

As described with reference to FIG. 18, it is assumed that the number of connections of the optical hub site 101 is limited to four. In this assumption, the optical network designing device cannot set a connection for the fifth demand path as indicated by a dotted line of FIG. 19.

The optical network designing device can design demand paths that have been requested by the operator and extend through the optical hub site in which the number of connections is not limited as illustrated in FIG. 17.

The optical network designing device can set only four connections for each of the ports in the asymmetric optical hub site, although the topology information indicates the six ports P0 to P5 (or five connections can be set for each of the ports P0 to P5). Thus, the optical network designing device cannot calculate the demand path requested by the operator as illustrated in FIGS. 18 and 19 in some cases.

Traditionally, the sizes of optical networks have been small, and there have been few cases in which paths are designed so that a limit to the number of connections is violated. In recent years, however, the sizes of optical networks have increased, and the number of demand paths to be designed has increased. Thus, the number of connections to be set when demand paths are calculated has increased. For example, the connection indicated by the dotted line of FIG. 19 is required in many cases.

To avoid this, it can be considered that the number of output ports of the WSSs 111a to 111f and 112a to 112f is increased (or the limited number of connections is increased) to prevent the limit to the number of connections from being violated. However, when the cost of producing the optical hub site is considered, it is not preferable to increase the number of output ports of the WSSs 111a to 111f and 112a to 112f. Thus, the optical network designing device cannot design paths of a large optical network in some cases.

Accordingly, it is an object of the embodiments to provide an optical network designing device, an optical network designing method and an optical network designing program, which allow a path of an optical network to be designed even when the size of the optical network is increased.

A first embodiment is described with reference to the accompanying drawing.

FIG. 1 is a diagram illustrating an optical network designing device according to the first embodiment. The optical network designing device 1 illustrated in FIG. 1 designs a path of an optical network that includes an asymmetric optical hub site. The optical network designing device 1 includes a path calculating unit 1a, a violation determining unit 1b, a removal selecting unit 1c and a path recalculating unit 1d.

The path calculating unit 1a calculates a traffic path requested by an operator without consideration of a limited number of connections of the asymmetric optical hub site.

Specifically, the path calculating unit 1a sets a connection and calculates the traffic path requested by the operator while assuming that the number of connections of each of ports of the asymmetric optical hub site is not limited.

The violation determining unit 1b determines whether or not a limit to the number of connections of the asymmetric optical hub site through which the traffic path calculated by the path calculating unit 1a passes is violated.

When the violation determining unit 1b determines that the limit to the number of connections is violated, the removal selecting unit 1c selects a connection to be removed from the asymmetric optical hub site determined to violate the limit to the number of connections.

The path recalculating unit 1d recalculates a traffic path that passes through the asymmetric optical hub site in which the removal connection selected by the removal selecting unit 1c has been removed. Specifically, the removal selecting unit 1c selects a connection to be removed from among the asymmetric optical hub site that violates the limit to the number of connections. The path recalculating unit 1d recalculates a traffic path that passes through the asymmetric optical hub site in which the removal connection has been removed so that the violation of the limit to the number of connections is resolved.

As described above, the optical network designing device 1 calculates a demand path requested by the operator without consideration of the limit to the number of connections of the asymmetric optical hub site and determines whether or not the limit to the number of connections of the asymmetric optical hub site through which the calculated path passes is violated. The optical network designing device 1 selects a connection to be removed from the asymmetric optical hub site and recalculates a traffic path. Thus, the optical network designing device 1 can design a path of an optical network even when the size of the optical network is increased.

Next, a second embodiment is described with reference to the accompanying drawings.

Figure 2:
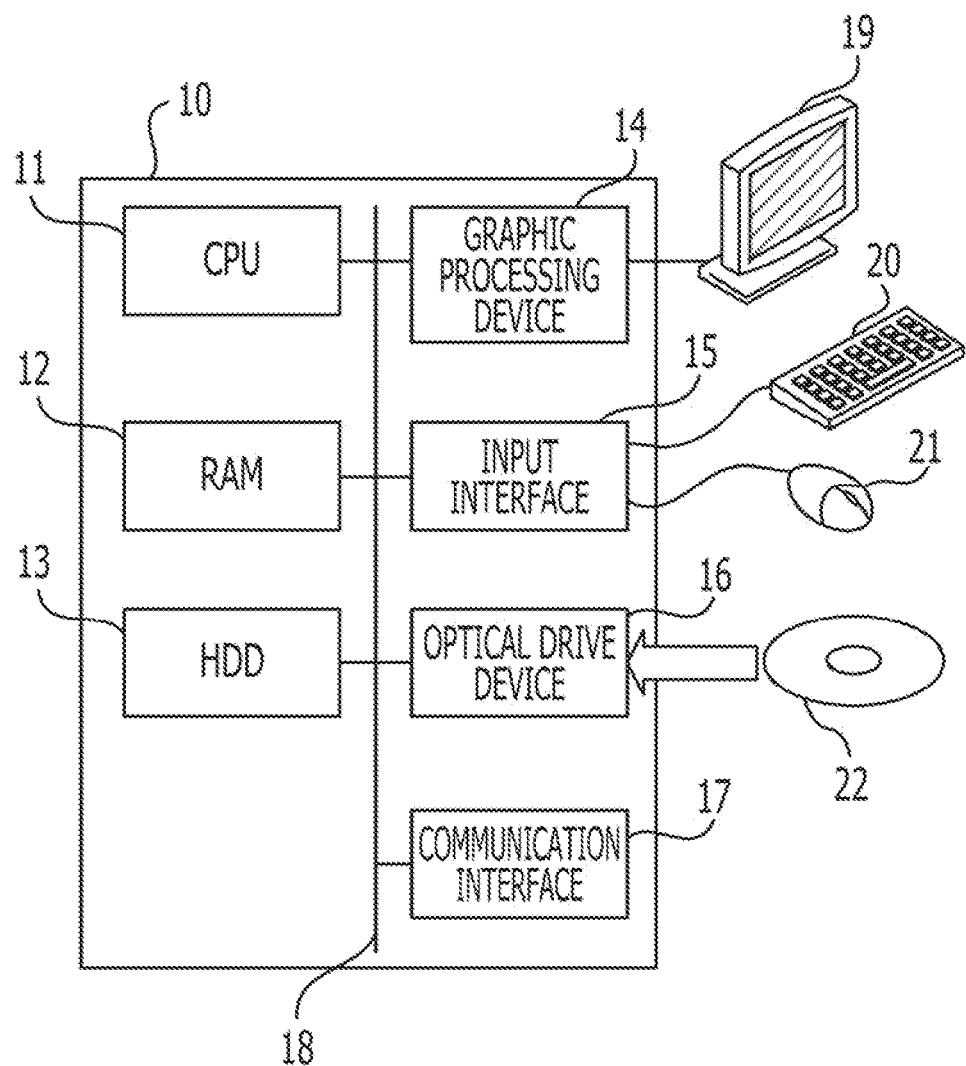
FIG. 2 is a diagram illustrating an example of a hardware configuration of an optical network designing device according to a second embodiment.

FIG. 2 is a diagram illustrating an example of a hardware configuration of an optical network designing device according to the second embodiment. An entire optical network designing device 10 is controlled by a central processing unit (CPU) 11. The CPU 11 is coupled to a random access memory (RAM) 12 and a plurality of peripheral devices through a bus 18.

The RAM 12 is used as a main storage device of the optical network designing device 10. At least a part of a program of an operating system (OS) and an application program is temporarily stored in the RAM 12. The program of the OS and the application program are executed by the CPU 11. For example, at least a part of an application program that designs a path of an optical network is temporarily stored in the RAM 12. In addition, various types of data that is necessary for a process that is performed by the CPU 11 are stored in the RAM 12.

As the peripheral devices coupled to the bus 18, a hard disk drive (HDD) 13, a graphic processing device 14, an input interface 15, an optical drive device 16 and a communication interface 17 are provided.

The HDD 13 has a disk therein, and magnetically writes data in the disk and reads the data from the disk. The HDD 13 is used as a secondary storage device of the optical network designing device 10. The program of the OS, the application program and the various types of data are stored in the HDD 13. As the secondary storage device, a semiconductor storage device such as a flash memory can be used.

A monitor 19 is coupled to the graphic processing device 14. The graphic processing device 14 causes an image to be displayed on a screen of the monitor 19 according to a command from the CPU 11. As the monitor 19, a display device provided with a cathode ray tube (CRT), a liquid crystal display device, or the like is used.

A keyboard 20 and a mouse 21 are coupled to the input interface 15. The input interface 15 transfers, to the CPU 11, signals transmitted from the keyboard 20 and the mouse 21. The mouse 21 is an example of a pointing device. Another pointing device may be used instead of the mouse 21. As the other pointing device, a touch panel, a tablet, a touch pad, a trackball or the like may be used.

The optical drive device 16 uses a laser beam or the like so as to read data stored in an optical disc 22. The optical disc 22 is a portable storage medium. Data is stored in the optical disc 22 and can be read by means of optical reflection. As the optical disc 22, a digital versatile disc (DVD), a DVD-RAM, a compact disc read only memory (CD-ROM), a recordable compact disc (CD-R), a rewritable compact disc (CD-RW) or the like may be used.

The communication interface 17 is coupled to a network such as the Internet, for example. The communication interface 17 transmits and receives data to and from another computer or a communication device through the network.

With the hardware configuration described above, the optical network designing device 10 can achieve a processing function of designing a path of an optical network.

Figure 3:
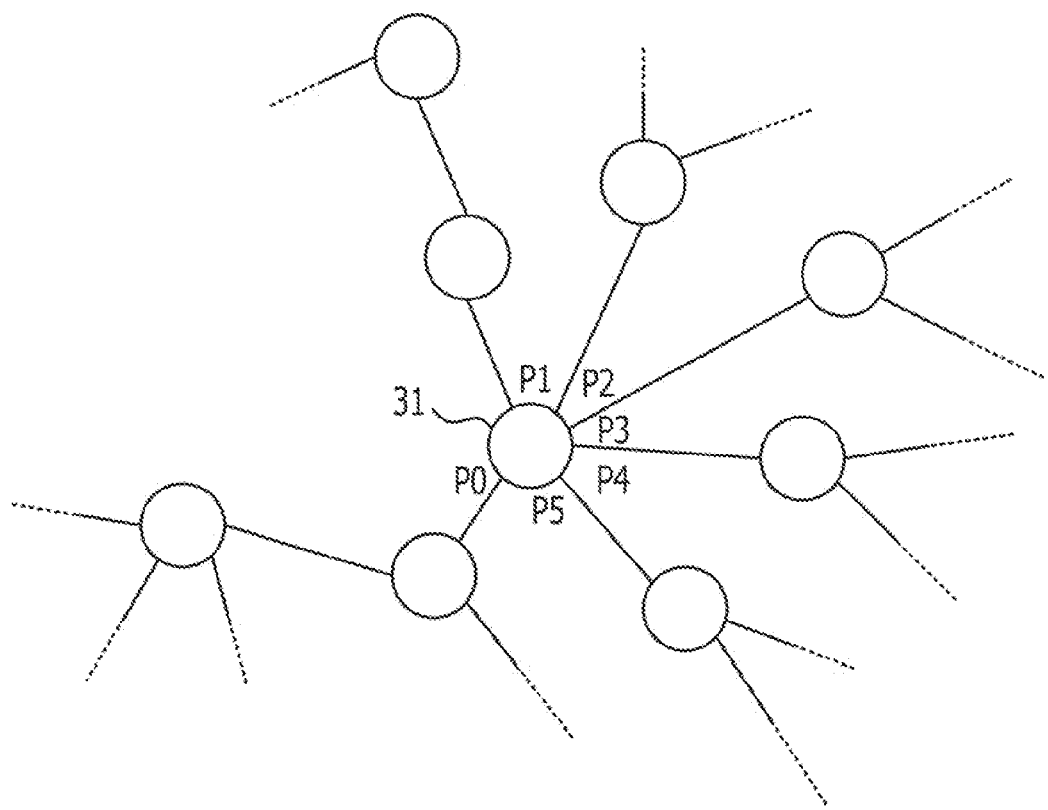
FIG. 3 is a diagram illustrating an example of an optical network that has paths designed by the optical network designing device.

FIG. 3 is a diagram illustrating an example of an optical network that has paths designed by the optical network designing device. As illustrated in FIG. 3, the optical network includes an optical hub site 31 and other optical hub sites indicated by circles. At least one of the optical hub sites illustrated in FIG. 3 is an asymmetric optical hub site. It is assumed that the optical hub site 31 is an asymmetric optical hub site. In the following description, an asymmetric optical hub site is also called an A-Hub (Asymmetric-Hub).

The optical network designing device 10 stores information on a topology of an optical network. The topology information can be stored in the HDD 13 of the optical network designing device 10 using any of the keyboard 20, the mouse 21 and the optical disc 22. In addition, the optical network designing device 10 can communicate with an optical hub site of the optical network through the communication interface 17, acquire the topology information from the optical hub site, and store the topology information in the HDD 13. The topology information includes optical hub site information, span information and demand path information.

The optical hub site information includes the number (number of spans extending from the optical hub site) of ports of the optical hub site. When the optical hub site is an A-Hub, the optical hub site information includes a limit to the number of connections and parameters (such as transmission delays of the connections and a cost) that are necessary to calculate the shortest path.

The span information includes information on optical hub sites located at both edges of the span and parameters (such as a transmission delay of the span and a cost) that are necessary to calculate the shortest path.

The demand path information includes information on optical hub sites that serve as a start point of a demand path requested by the operator and an end point of the demand path.

The optical network designing device 10 references the topology information on the basis of a predetermined path selection method without consideration of the limit to the number of connections and designs (calculates) the demand path requested by the operator. As the predetermined path selection method, Dijkstra's algorithm is used, for example.

In the following description, the optical network designing device 10 calculates a demand path using Dijkstra's algorithm.

Figure 4:
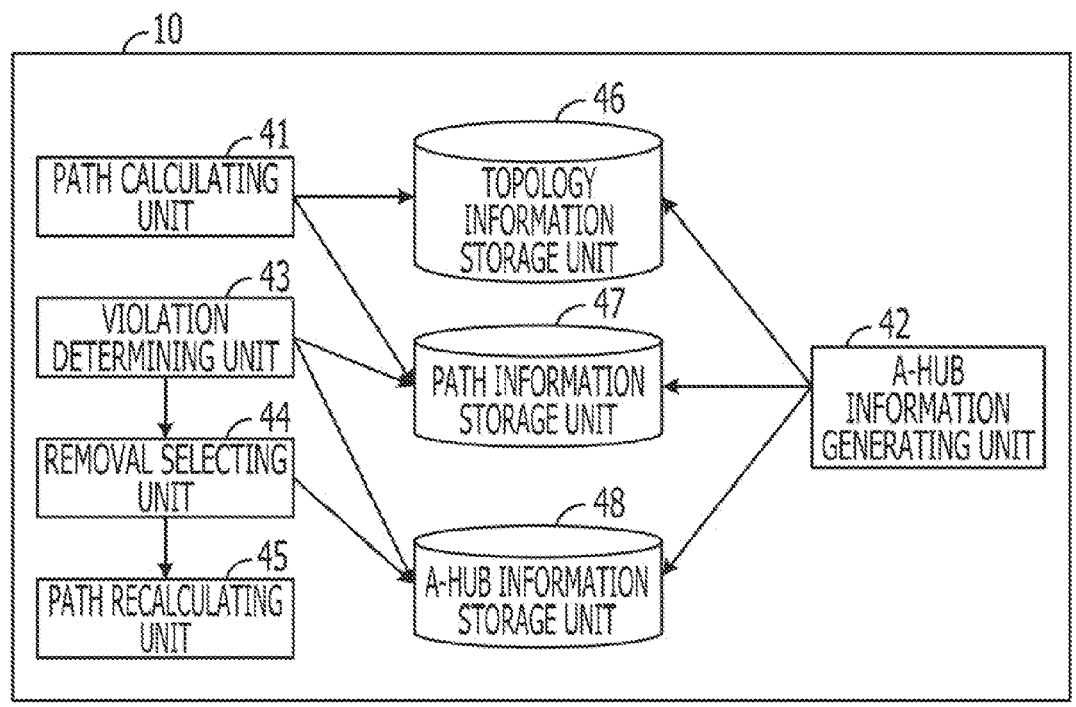
FIG. 4 is a functional block diagram illustrating the optical network designing device.

FIG. 4 is a functional block diagram illustrating the optical network designing device. As illustrated in FIG. 4, the optical network designing device 10 includes a path calculating unit 41, an A-Hub information generating unit 42, a violation determining unit 43, a removal selecting unit 44, a path recalculating unit 45, a topology information storage unit 46, a path information storage unit 47 and an A-Hub information storage unit 48.

The path calculating unit 41 references the topology information stored in the topology information storage unit 46 and calculates a demand path on the basis of Dijkstra's algorithm without consideration of the limit to the number of connections of the A-Hub. The path calculating unit 41 causes the calculated demand path to be stored in the path information storage unit 47.

The A-Hub information generating unit 42 references the topology information storage unit 46 and the path information storage unit 47 and generates A-Hub information for each of A-Hubs of the optical network. The A-Hub information includes information on connections related to each of ports of each of the A-Hubs that form the optical network. The A-Hub information generating unit 42 causes the generated A-Hub information to be stored in the A-Hub information storage unit 48.

Figure 5:
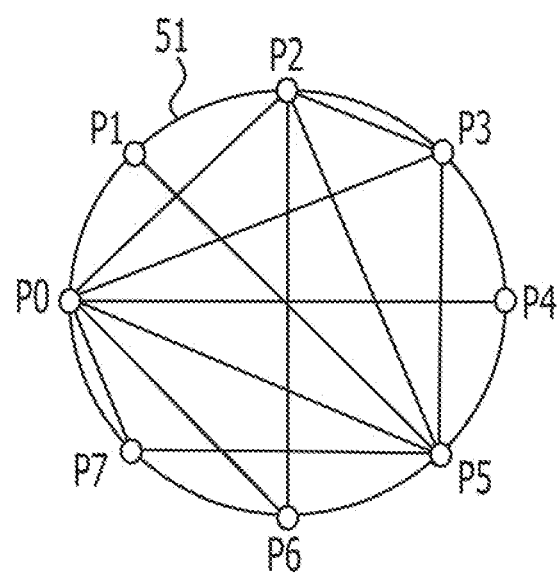
FIG. 5 is a diagram illustrating an A-Hub to explain A-Hub information.

FIG. 5 is a diagram illustrating an A-Hub in order to explain the A-Hub information. In FIG. 5, an optical hub site 51 that is an A-Hub and has ports P0 to P7 is illustrated. It is assumed that a limited number of connections of each of the ports of the optical hub site 51 is four. In other words, up to four connections can be established from each of the ports P0 to P7 in the optical hub site 51.

As described above, the path calculating unit 41 calculates a demand path without consideration of the limit to the number of connections. It is assumed that connections of the ports P0 to P7 are established in the optical hub site 51 as illustrated in FIG. 5.

FIG. 6 is a diagram illustrating an example of the configuration of data stored in the A-Hub information storage unit. In FIG. 6, the A-Hub information storage unit 48 is illustrated. As illustrated in FIG. 6, the A-Hub information storage unit 48 has a field for the ports, a field for the number of connections of each of the ports, a field for an additional connection flag, a field for Px_add, a field for an excess connection flag, and a field for Px_over.

In the field for the ports, identifiers of the ports included in the A-Hub are stored. In the field for the number of connections of each of the ports, the number of connections that are established from each of the ports is stored. In the field for the additional connection flag, information on whether or not a connection from each of the ports can be added is stored. In FIG. 6, "Yes" indicates that a connection from the port can be added, and "No" indicates that a connection from the port cannot be added.

In the field for Px_add, the number of connections that can be additionally established from each of the ports is stored. In the field for the excess connection flag, information on whether or not the number of connections that are established from each of the ports exceeds the limited number of connections of the port is stored. In FIG. 6, "Over" indicates that the number of connections that are established from the port exceeds the limited number of connections of the port, and "No" indicates that the number of connections that are established from the port does not exceed the limited number of connections of the port. In the field for Px_over, the number of excess connections of each of the ports, which is a value obtained by subtracting the limited number of connections of the port from the number of the actually established connections of the port, is stored.

The A-Hub information illustrated in FIG. 6 indicates the A-Hub information on the optical hub site 51 illustrated in FIG. 5. For example, six connections are established from the port P0 of the optical hub site 51 as illustrated in FIG. 5. Thus, in the field for the number of connections of the port P0, "6" is stored as illustrated in FIG. 6. The limited number of connections of each of the ports of the optical hub site 51 is four. Thus, in the field for the additional connection flag, "No" is stored. In addition, in the field for Px_add, "0" is stored. Furthermore, in the field for the excess connection flag, "Over" is stored. In the field for Px_over, "2" is stored.

In addition, for example, one connection is established from the port P1 of the optical hub site 51 as illustrated in FIG. 5. Thus, in the field for the number of connections of the port 1, "1" is stored. The limited number of connections of each of the ports of the optical hub site 51 is four. Thus, in the field for the additional connection flag, "Yes" is stored. In the field for Px_add, "3" is stored. In addition, in the field for the excess connection flag, "No" is stored. In the field for Px_over, "0" is stored.

The A-Hub information generating unit 42 can detect the connections of the A-Hub illustrated in FIG. 5 by referencing the path information storage unit 47. In addition, the A-Hub information generating unit 42 can detect the limited number of connections by referencing the topology information storage unit 46. Thus, the A-Hub information generating unit 42 can generate the A-Hub information illustrated in the fields of FIG. 6 by referencing the topology information storage unit 46 and the path information storage unit 47. The A-Hub information generating unit 42 allows the generated A-Hub information to be stored in the A-Hub information storage unit 48.

In FIG. 6, only the A-Hub information on the optical hub site 51 is illustrated. The A-Hub information generating unit 42 generates A-Hub information for each of the A-Hubs forming the optical network and causes the generated A-Hub information to be stored in the A-Hub information storage unit 48.

Returning to FIG. 4, the violation determining unit 43 references the A-Hub information storage unit 48 and determines whether or not the limited number of connections of the A-Hub through which the demand path calculated by the path calculating unit 41 passes is violated. For example, the violation determining unit 43 references the excess connection flag of the A-Hub information storage unit 48 and can determine that the limit to the number of connections of the optical hub site 51 is violated.

When the violation determining unit 43 determines that the limit to the number of connections is violated, the removal selecting unit 44 references the A-Hub information storage unit 48 and selects a connection to be removed from the A-Hub determined to violate the limit to the number of connections. For example, the removal selecting unit 44 selects the connection between the ports P0 and P5 as a connection to be removed in FIG. 5. A method for selecting a connection to be removed is described later in detail.

The path recalculating unit 45 removes, from the A-Hub, the connection selected by the removal selecting unit 44 and recalculates a demand path. A method for recalculating a demand path is described later in detail.

The method for selecting a connection to be removed is described below. In the following description, a connection to be removed is also called a removal connection.

Figure 7:
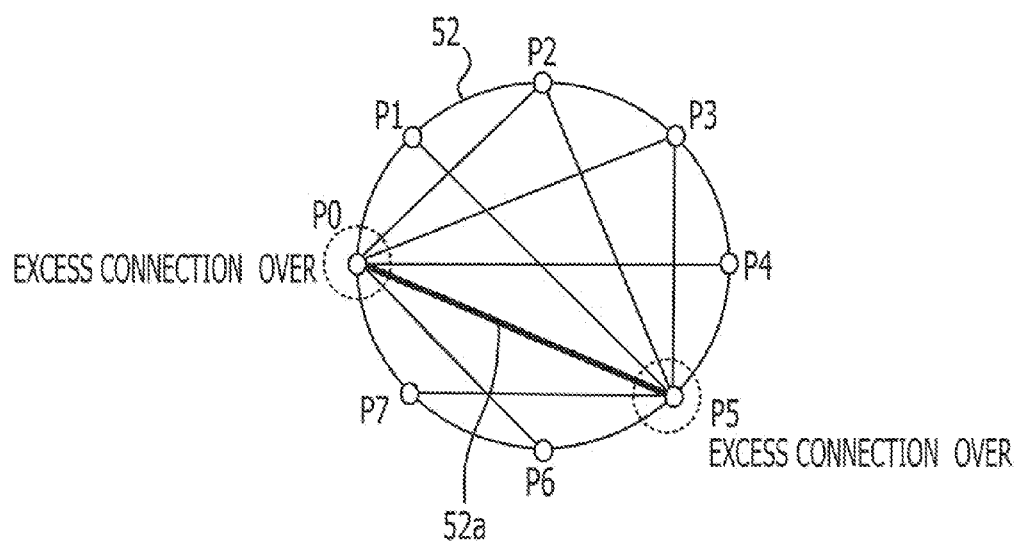
FIG. 7 is a diagram to explain a method for selecting a connection to be removed.

FIG. 7 is a diagram to explain the method for selecting a connection to be removed. In FIG. 7, an optical hub site 52 that has ports P0 to P7 and is an A-Hub is illustrated. It is assumed that a limited number of connections of each of the ports of the optical hub site 52 is four. In addition, it is assumed that connections are established in the optical hub site 52 by the path calculating unit 41 as illustrated in FIG. 7.

The removal selecting unit 44 references the A-Hub information storage unit 48 and selects, as a removal connection on a priority basis, a connection between two port that each have more than the limited number of connections.

In the example illustrating in FIG. 7, more than the limited number of connections are established from each of the ports P0 and P5. The removal selecting unit 44 selects a connection 52a as a removal connection while prioritizing the connection 52a over the other connections. In the following description, a connection between two ports that each have more than a limited number of connections is also called an important connection.

The important connection is prioritized and selected as a removal connection since the violation of the limit to the number of connections of the two ports can be resolved by removing the important connection. In the example illustrated in FIG. 7, the violation of the limit to the number of connections of the ports P0 and P5 can be resolved by selecting, as the removal connection, the connection 52a that is the important connection.

Next, the case in which a plurality of important connections are present is described.

Figure 8:
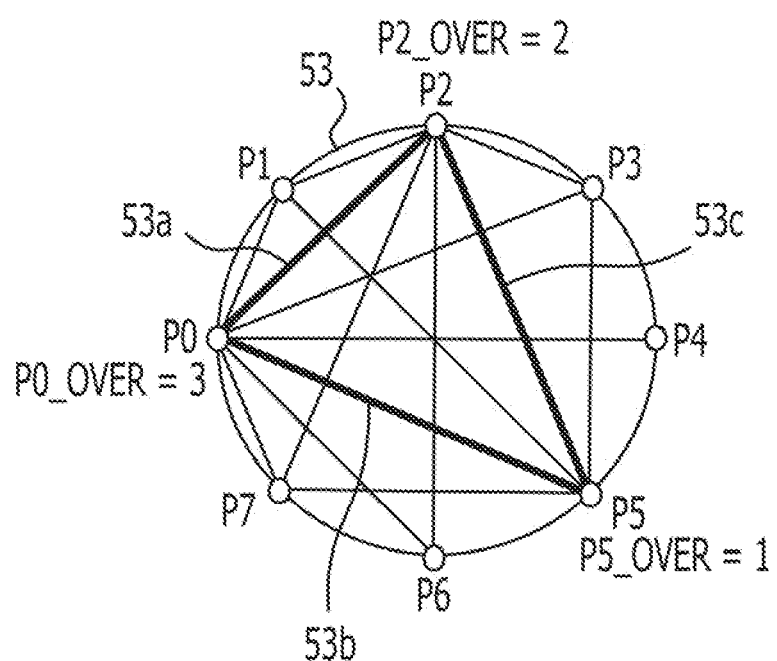
FIG. 8 is a diagram to explain a method for selecting a connection to be removed when two or more important connections are present.

FIG. 8 is a diagram to explain a method for selecting a connection to be removed when two or more important connections are present. In FIG. 8, an optical hub site 53 that has ports P0 to P7 and is an A-Hub is illustrated. It is assumed that connections are established in the optical hub site 53 by the path calculating unit 41 as illustrated in FIG. 8.

The removal selecting unit 44 references the A-Hub information storage unit 48 and selects, as a removal connection on a priority basis, an important connection between two ports that each have more than a limited number of connections. When a plurality of important connections are present, the removal selecting unit 44 selects, as a removal connection on a priority basis, an important connection between two ports from which a large number of excess connections are established. The number of excess connections is calculated by subtracting the limited number of connections of each of the ports from the number of established connections of the port.

In the example illustrated in FIG. 8, three important connections 53a, 53b and 53c are present. The number P0_over of excess connections of the port P0 from which the connection 53a is established is three. The number P2_over of excess connections of the port P2 is two. Thus, the total number of the excess connections of the ports P0 and P2 between which the connection 53a is established is five. In addition, the number P0_over of excess connections of the port P0 from which the connection 53b is established is three. The number P5_over of excess connections of the port P5 is one. Thus, the total number of the excess connections of the ports P0 and P5 between which the connection 53b is established is four. In addition, the number P2_over of excess connections of the port P2 from which the connection 53c is established is two. The number P5_over of excess connections of the port P5 is one. Thus, the total number of the excess connections of the ports P2 and P5 between which the connection 53c is established is three. In the example illustrated in FIG. 8, therefore, the removal selecting unit 44 selects, as a removal connection, the connection 53a between the ports that have the largest number of excess connections.

In this manner, when a plurality of important connections are present, the removal selecting unit 44 selects a removal connection on a priority basis in order from the largest cause (number of excess connections) of a violation of the limit to the number of connections. It is, therefore, possible to quickly resolve the violation of the limit to the number of connections.

When a plurality of important connections between ports that have the same total number of excess connections are present, the removal selecting unit 44 selects, as a removal connection on a priority basis, a connection to which a small number of demand paths belong. The number of demand paths that belong to the connection can be acquired by referencing the path information storage unit 47. This can reduce the number of demand paths causing a change of a connection in the recalculation of the demand paths by the path recalculating unit 45, and reduce a load of a process that is performed by the optical network designing device 10.

In addition, when a plurality of removal connections to which the same number of demand paths belong are present, the removal selecting unit 44 randomly selects a removal connection from among the plurality of removal connections.

Next, a method for selecting a removal connection when an important connection is not present is described.

Figure 9:
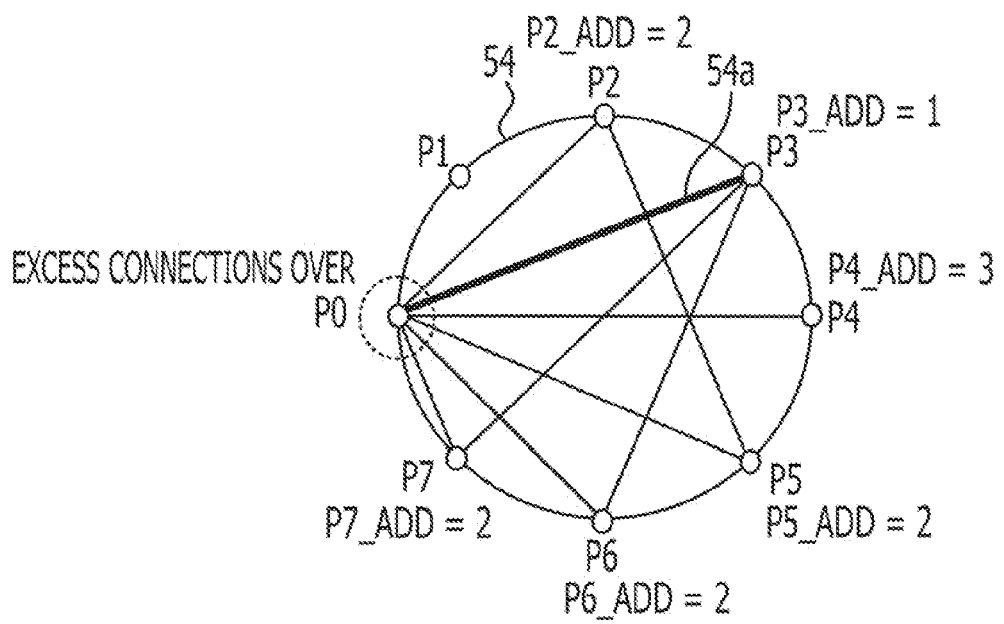
FIG. 9 is a diagram to explain a method for selecting a connection to be removed when an important connection is not present.

FIG. 9 is a diagram to explain the method for selecting a removal connection when an important connection is not present. In FIG. 9, an optical hub site 54 that has ports P0 to P7 and is an A-Hub is illustrated. It is assumed that a limited number of connections of each of the ports the optical hub site 54 is four. It is assumed that connections are established in the optical hub site 54 by the path calculating unit 41 as illustrated in FIG. 9.

The removal selecting unit 44 references the A-Hub information storage unit 48 and selects, as a removal connection on a priority basis, an important connection between two ports that each have more than the limited number of connections. When an important connection between two ports that each have the limited number of connections is not present, the removal selecting unit 44 selects, as a removal connection on a priority basis, a connection between a certain port that has more than the limited number of connections and a port that is located on the opposite side of the certain port and whose allowable number of additional connections is smallest. The allowable number of the additional connections of the port is the number of connections that can be additionally established from the port so that the number of connections of the port is equal to or smaller than the limited number of connections of the port. When two or more demand paths belong to the selected removal connection, the removal selecting unit 44 cancels the selection of the removal connection and selects, as the removal connection on a priority basis, a connection between the certain port that has more than the limited number of connections and a port that is located on the opposite side of the certain port and whose allowable number of additional connections is the second smallest.

For example, in the example illustrated in FIG. 9, an important connection between two ports that each have more than the limited number of connections is not present, and the limit to the number of connections of the port P0 is violated. In this case, the removal selecting unit 44 references the A-Hub information storage unit 48 and acquires the allowable number of connections of each of the ports P2 to P7 that are located on the opposite side of the port P0. In the example illustrated in FIG. 9, the allowable numbers P2_add to P7_add of the ports P2 to P7 are 2, 1, 3, 2, 2 and 2, respectively. Thus, the removal selecting unit 44 selects, as the removal connection, a connection 54*a* between the port P0 and the port P3 whose allowable number of connections is smallest.

In this manner, when an important connection is not present, the removal selecting unit 44 selects, as the removal connection, a connection between a port that violates the limit the number of connections and a port that almost violates the limit the number of connections. Thus, the ports of the A-Hub each can have a margin to avoid violating the limit the number of connections.

When a plurality of removal connections between a port and ports whose allowable numbers of connections are small are present, the removal selecting unit 44 selects, as a removal connection on a priority basis, a connection to which a small number of demand paths belong. The number of the demand paths that belong to the connection can be acquired by referencing the path information storage unit 47. This can reduce the number of demand paths causing a change of a connection in the recalculation of the demand paths by the path recalculating unit 45, and reduce a load of the process that is performed by the optical network designing device 10.

In addition, when a plurality of removal connections to which the same number of demand paths belong are present, the removal selecting unit 44 randomly selects a removal connection from among the plurality of removal connections.

Next, the recalculation of a demand path is described.

The path recalculating unit 45 removes the removal connection selected by the removal selecting unit 44 from the A-Hub and recalculates a demand path on the basis of Dijkstra's algorithm. The path recalculating unit 45 searches alternate connections for all demand paths belonging to the selected removal connection on a demand path basis. Specifically, the path recalculating unit 45 searches alternate connections along which the demand paths that belong to the selected removal connection can be diverted.

When a demand path for which an alternate connection cannot be found is present, the path recalculating unit 45 determines that the removal connection selected by the removal selecting unit 44 cannot be removed. In this case, the removal selecting unit 44 reselects a removal connection from among connections other than the selected removal connection on the basis of the aforementioned selection method. Then, the path recalculating unit 45 recalculates the demand path.

The path recalculating unit 45 searches alternate connections on the basis of Dijkstra's algorithm while weighting the remaining connections other than the removal connection removed from the A-Hub.

Figure 10:
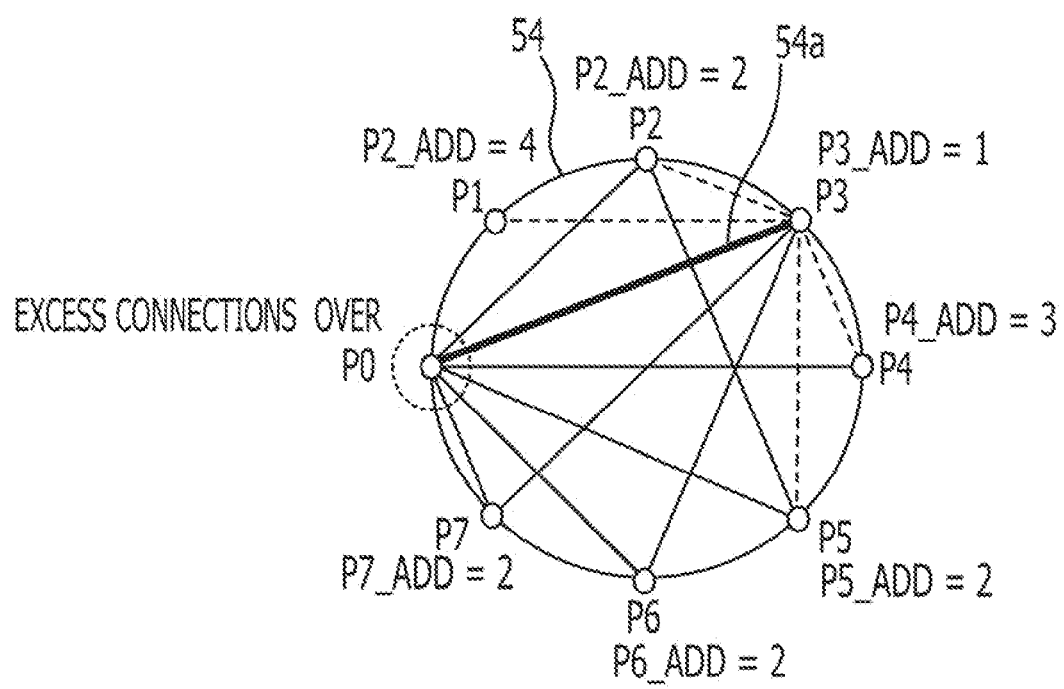
FIG. 10 is a diagram to explain weighting of connections.

FIG. 10 is a diagram to explain weighting of the connections. In FIG. 10, the optical hub site 54 that has the ports P0 to P7 and is the A-Hub is illustrated. It is assumed that a limited number of connections of each of the ports of the optical hub site 54 is four. Furthermore, it is assumed that connections are established in the optical hub site 54 by the path calculating unit 41 as indicated by solid lines of FIG. 10. In addition, it is assumed that the removal selecting unit 44 selects the connection 54*a* as a removal connection.

Any of connections that are indicated by dotted lines of FIG. 10 can be established so that the limit to the number of connections is not violated in the recalculation of a demand path. In the following description, a connection that is established by the path calculating unit 41 is also called a used connection, and a connection that is not the used connection and can be established so that the limit to the number of connections is not violated is also called a usable connection.

The path recalculating unit 45 removes, from the optical hub site 54, the connection 54*a* that is a removal connection.

Then, the path recalculating unit 45 weights the used connections and the usable connections and calculates a demand path that belongs to the removal connection. In this case, in order to determine the demand path, the path recalculating unit 45 performs the weighting so that the usable connections are prioritized over the used connections and selected.

In addition, the path recalculating unit 45 weights the usable connections so that a usable connection between two ports whose allowable numbers of connections are large is selected on a priority basis from among the usable connections. For example, the path recalculating unit 45 weights the usable connections so that a usable connection between two ports whose total allowable number of connections is large is selected on a priority basis. In other words, the path recalculating unit 45 weights the usable connections so that a usable connection between ports that each have a margin to avoid violating the limit to the number of connections is selected.

In addition, the path recalculating unit 45 weights the used connections so that a used connection to which a small number of demand paths belong is selected on a priority basis from among the used connections.

Operations of the optical network designing device 10 are described with reference to a flowchart.

Figure 11:
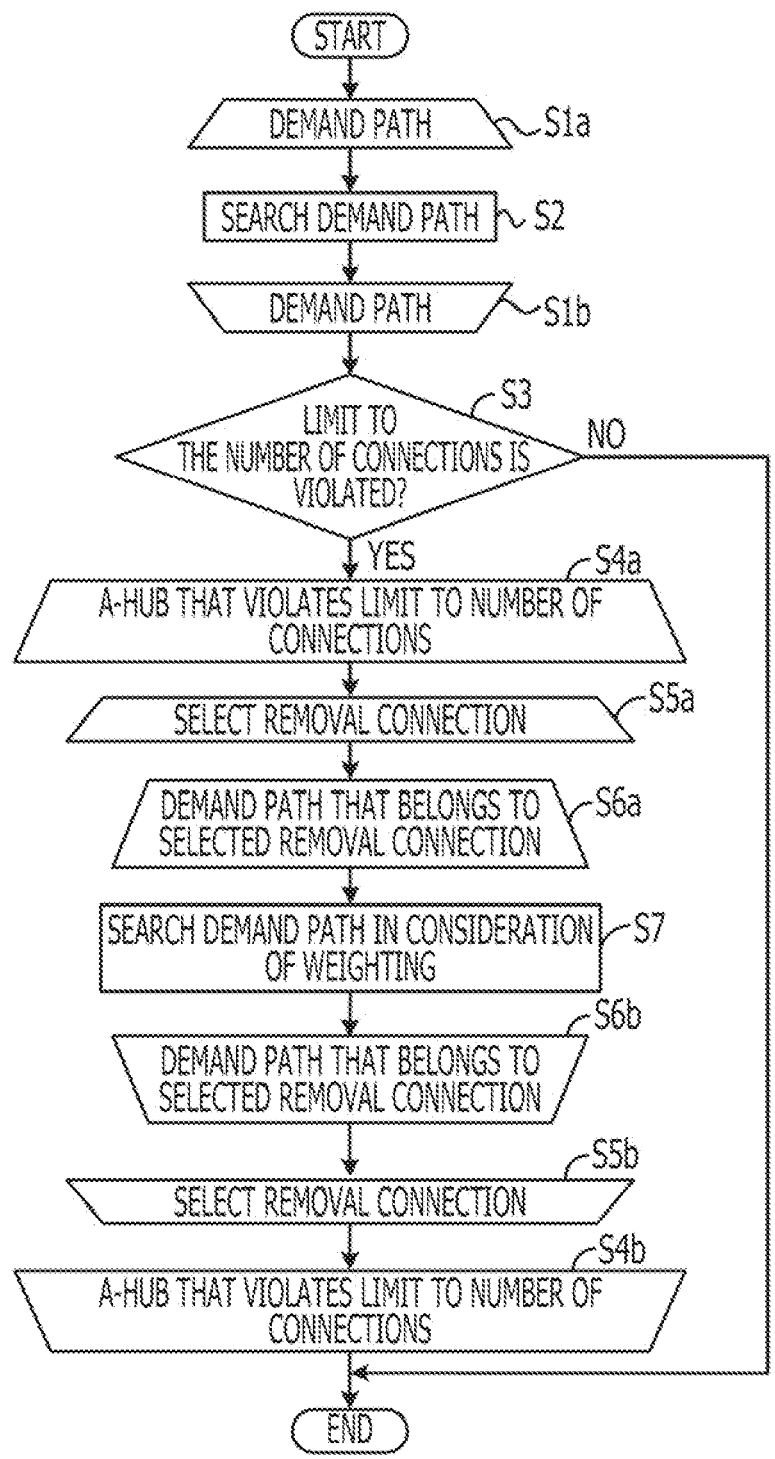
FIG. 11 is a flowchart of a process that is performed by the optical network designing device.

FIG. 11 is the flowchart of a process that is performed by the optical network designing device 10.

In operations S1*a* and S1*b*, the path calculating unit 41 performs operation S2 for the number of demand paths requested by the operator.

In operation S2, the path calculating unit 41 searches a demand path requested by the operator. In this case, the path calculating unit 41 searches the demand path without consideration of a limit to the number of connections.

In operation S3, the violation determining unit 43 determines whether or not the limit to the number of connections is violated in an A-Hub through which the demand path calculated by the path calculating unit 41 passes. When the limit to the number of connections is not violated, the violation determining unit 43 terminates the process. When limit to the number of connections is violated, the violation determining unit 43 causes the process to proceed to operation S4*a*.

In operations S4*a* and S4*b*, the removal selecting unit 44 and the path recalculating unit 45 causes the process to proceed to operations S5 to S7 to be performed on the A-Hub that violates the limit to the number of connections.

In operations S5*a* and S5*b*, the removal selecting unit 44 selects a removal connection to be removed from the A-Hub. The selection of the removal connection is performed in consideration of an important connection as described above.

In operations S6*a* and S6*b*, the path recalculating unit 45 causes the process to proceed to operation S7 to be performed on a demand path belonging to the selected removal connection on a demand path basis.

In operation S7, the path recalculating unit 45 searches the demand path again while the removal connection is already removed. In this case, the path recalculating unit 45 weights connections as described above.

The path recalculating unit 45 causes the process to proceed to operation S6*a* until the path recalculating unit 45 searches all demand paths that belongs to the removal connections.

When the path recalculating unit 45 cannot find all or a part of the demand paths belonging to the removal connection, or when an alternate connection is not present, the path recalculating unit 45 determines that the removal connection cannot be removed, and the path recalculating unit 45 causes the process to proceed to operation S5*a*.

In addition, when the path recalculating unit 45 can find all the demand paths and the limit to the number of connections is still violated, the path recalculating unit 45 causes the process to proceed to operation S5a.

When a violation of the limit to the number of connections is resolved in the interested A-Hub, the path recalculating unit 45 causes the process to proceed to operation S4a in order to search a path of the next A-Hub in which a limit to the number of connections is violated. The path recalculating unit 45 terminates the process when an A-Hub in which a limit to the number of connections is violated is not present.

An example of the operations of the optical network designing device 10 is described below.

Figure 12:
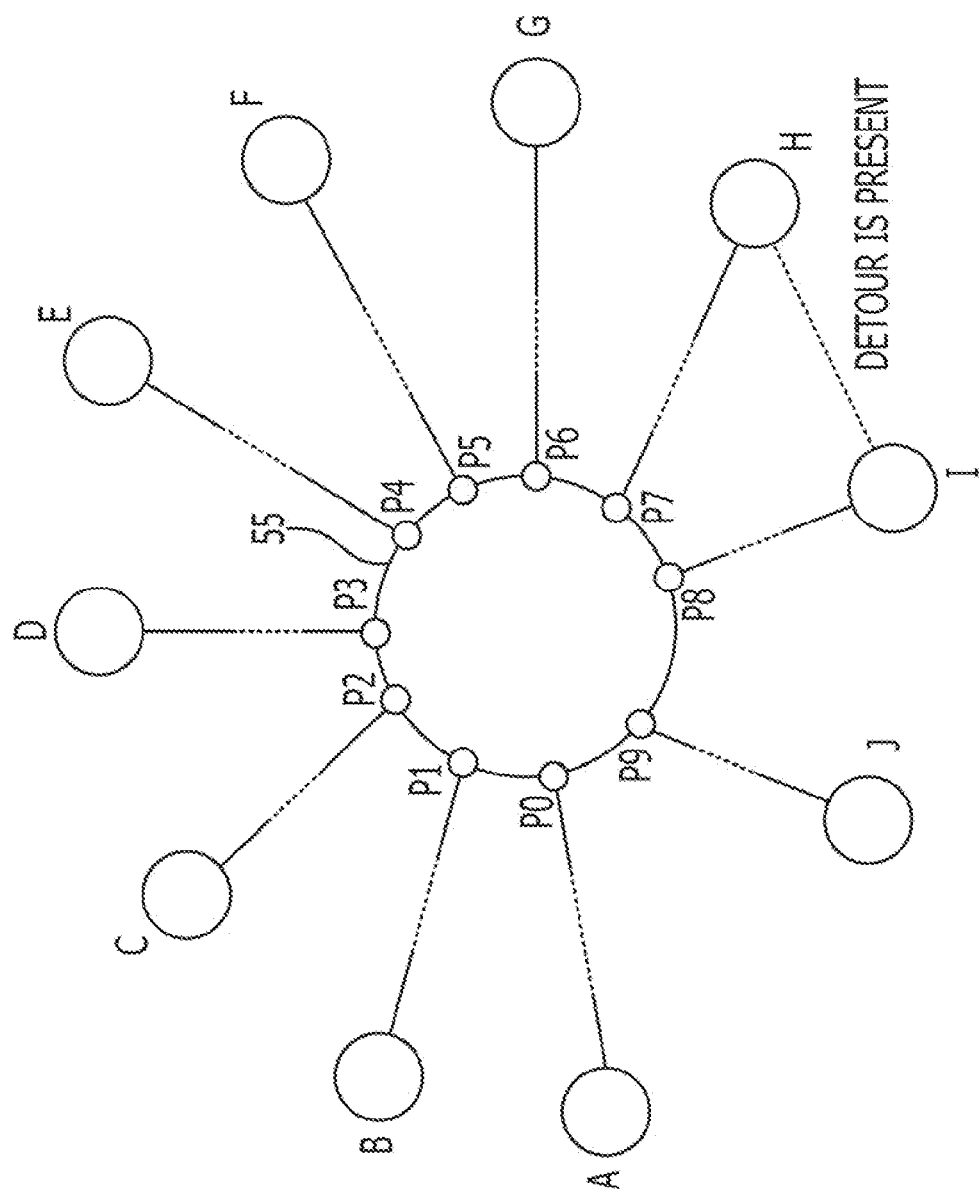
FIG. 12 is a diagram illustrating an example of operations of the optical network designing device.

FIG. 12 is a diagram illustrating the example of the operations of the optical network designing device. In FIG. 12, an optical hub site 55 that has ports P0 to P9 and is an A-Hub is illustrated. In addition, FIG. 12 illustrates optical hub sites A to J.

Demand paths that are requested by the operator are indicated in a frame illustrated in FIG. 12. It is assumed that a limited number of connections of each of the ports of the optical hub site 55 is four. The optical hub sites H and I have a connection relationship as indicated by a dotted line of FIG. 12.

The optical network designing device 10 calculates each of demand paths on the basis of Dijkstra's algorithm without consideration of the limited number of connections. It is assumed that the optical network designing device 10 designs paths that pass through connections of the optical hub site 55 as follows. Dijkstra's algorithm is executed once for each of the following numbered items.

1. For a demand path A-B between the optical hub sites A and B, a path is designed, which passes through a connection between the ports P0 and P1.

2. For a demand path A-C between the optical hub sites A and C, a path is designed, which passes through a connection between the ports P0 and P2.

3. For a demand path A-H between the optical hub sites A and H, a path is designed, which passes through a connection between the ports P0 and P7.

4. For a demand path A-I between the optical hub sites A and I, a path is designed, which passes through a connection between the ports P0 and P8.

5. For a demand path A-J between the optical hub sites A and J, a path is designed, which passes through a connection between the ports P0 and P9.

6. For a demand path D-H between the optical hub sites D and H, a path is designed, which passes through a connection between the ports P3 and P7.

7. For a demand path E-H between the optical hub sites E and H, a path is designed, which passes through a connection between the ports P4 and P7.

8. For a demand path G-H between the optical hub sites G and H, a path is designed, which passes through a connection between the ports P6 and P7.

9. For a demand path J-H between the optical hub sites J and H, a path is designed, which passes through a connection between the ports P9 and P7.

10. For a demand path B-I between the optical hub sites B and I, a path is designed, which passes through a connection between the ports P1 and P8.

11. For a demand path C-I between the optical hub sites C and I, a path is designed, which passes through a connection between the ports P2 and P8.

12. For a demand path E-I between the optical hub sites E and I, a path is designed, which passes through a connection between the ports P4 and P8.

13. For a demand path F-I between the optical hub sites F and I, a path is designed, which passes through a connection between the ports P5 and P8.

Figure 13:
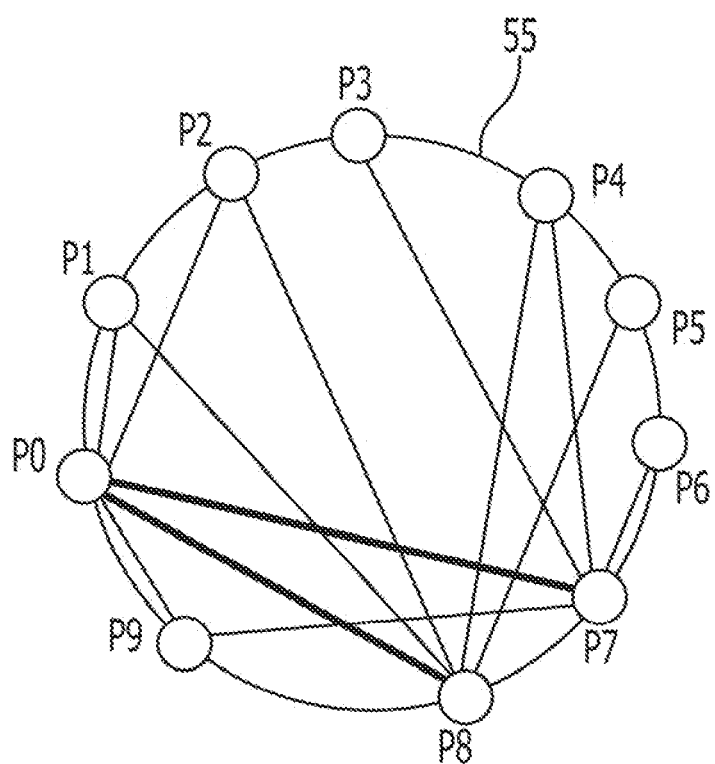
FIG. 13 is a diagram illustrating connections of an optical hub site when paths are designed without consideration of a limit to the number of connections.

FIG. 13 is a diagram illustrating the connections of the optical hub site when paths are designed without consideration of the limit to the number of connections. The connections are established in the optical hub site 55 according to the design of the paths described in the aforementioned items 1 to 13 as illustrated in FIG. 13. As illustrated in FIG. 13, the connection between the ports P0 and P7 and the connection between the ports P0 and P8 are important connections.

Return to FIG. 12.

14. In the aforementioned path design, the three ports P0, P7 and P8 of the optical hub site 55 each violate the limit to the number of connections. Among the connections that extend from the ports P0, P7 and P8, the number of important connections is two, which are the connection between the ports P0 and P7 and the connection between the ports P0 and P8.

In this case, it is assumed that the optical network designing device 10 selects the connection between the ports P0 and P8 as a removal connection. Then, the optical network designing device 10 removes the removal connection between the ports P0 and P8 and redesigns the demand path A-I that belongs to the removal connection.

In the example illustrated in FIG. 12, the optical hub sites H and I have the connection relationship. Thus, the optical network designing device 10 calculates the connection between the ports P0 and P7 as a connection of the demand path A-I.

15. At this time, only the port P7 violates the limit to the number of connections in the optical hub site 55, and an important connection is not present.

The optical network designing device 10 selects a connection from among connections that use the port P7 and can be removed, according to the aforementioned priorities. Specifically, the optical network designing device 10 selects, as a removal connection, a connection between the port P7 and a port whose allowable number of connections is small from among the connections between the port 7 and the ports P0, P3, P4, P6 and P9 that are located on the opposite side of the port P7.

a. The optical network designing device 10 selects, as a removal connection, the connection between the port P7 and the port P0 whose allowable number of connections is smallest. Since the two demand paths A-H and A-I belong to the selected removal connection, the removal connection is not removed.

b. The optical network designing device 10 selects, as a removal connection, the connection between the port P7 and the port P4 whose allowable number of connections is the second smallest, from among the connections between the port P7 and the ports P4 and P9.

16. The optical network designing device 10 removes the removal connection between the ports P4 and P7 and recalculates the demand path E-H that belongs to this removal connection.

In the example illustrated in FIG. 12, the optical hub sites H and I have the connection relationship. Thus, the optical network designing device 10 calculates the connection between the ports P4 and P8 as a connection of the demand path E-H.

In this manner, the optical network designing device 10 can design the demand paths by performing the calculating using Dijkstra's algorithm sixteen times in the example illustrated in FIG. 12.

The optical network designing device 10 described above calculates a demand path without consideration of a limit to the number of connections, selects a connection to be removed after the calculation, and recalculates the demand path.

On the other hand, there is a method for determining a limit to the number of connections for each calculation of a single demand path and searching a new path so that when the limit to the number of connections is violated, the violation is resolved. In the following description, an example in which whether to violate a limit to the number of connections is determined for each calculation of a single demand path.

FIG. 14 is a flowchart illustrating another operational example of the optical network designing device.

In operations S11a and S11b, the optical network designing device performs a process of the following operations on demand paths requested by the operator on a demand path basis.

In operation S12, the optical network designing device searches a demand path on the basis of Dijkstra's algorithm.

In operation S13, the optical network designing device determines whether or not the limit to the number of connections is violated by the path searched in operation S12. When the limit to the number of connections is violated, the optical network designing device causes the process to proceed to operation S14. When the limit to the number of connections is not violated, the optical network designing device causes the process to proceed to operation S11a in order to search the next demand path.

In operation S14, the optical network designing device searches the demand path that has caused the violation of the limit to the number of connections and passes through any of currently set connections.

In operation S15, the optical network designing device determines whether or not the demand path that has caused the violation of the limit to the number of connections and passes through any of the currently set connections can be designed. When the demand path that has caused the violation of the limit to the number of connections and passes through any of the currently set connections can be designed, the optical network designing device causes the process to proceed to operation S11a in order to search the next demand path. When the demand path that has caused the violation of the limit to the number of connections and passes through any of the currently set connections cannot be designed, the optical network designing device causes the process to proceed to operation S16.

In operation S16, the optical network designing device searches the demand path that has caused the violation of the limit to the number of connections and passes through any of connections that are not currently set.

In operation S17, the optical network designing device determines whether or not the demand path that has caused the violation of the limit to the number of connections and passes through any of the connections that are not currently set can be designed. When the demand path that has caused the violation of the limit to the number of connections and passes through any of the connections that are not currently set cannot be designed, the optical network designing device determines that the path cannot be designed, and the optical network designing device terminates the process. When the demand path that has caused the violation of the limit to the number of connections and passes through any of the connections that are not currently set can be designed, the optical network designing device causes the process to proceed to operation S18a.

In operation S18a and S18b, the optical network designing device performs a process of the following operations on an interested A-Hub (currently processed for a violation of the limit to the number of connections).

In operations S19a and S19b, the optical network designing device selects a removal connection.

In operations S20a and S20b, the optical network designing device performs operation S21 on demand paths that belong to the selected removal connection on a demand path basis.

In operation S21, the optical network designing device searches a demand path again while the removal connection is already removed.

The optical network designing device causes the process to proceed to operation S20a until the optical network designing device calculates all demand paths that belong to the removal connection.

When the optical network designing device cannot calculate all or a part of the demand paths that belong to the removal connection, or when an alternate connection is not present, the optical network designing device determines that the selected removal connection cannot be removed, and the process proceeds to operation S19a.

When a violation of the limit to the number of connections of the interested A-Hub is resolved, the optical network designing device causes the process to proceed to operation S18a in order to resolve a violation of a limit to the number of connections of the next A-Hub.

When the violation of the limit to the number of connections, which is caused by a demand path, is resolved, the optical network designing device causes the process to proceed to operation S11a in order to search the next demand path.

The operational example of the optical network designing device described with reference to FIG. 14 is described with reference to FIG. 12. The optical network designing device illustrated in FIG. 14 designs demand paths of the optical network illustrated in FIG. 12 as follows. Dijkstra's algorithm is executed once for each of the following numbered items.

1. For the demand path A-B, a path is designed, which passes through the connection between the ports P0 and P1.
2. For the demand path A-C, a path is designed, which passes through the connection between the ports P0 and P2.
3. For the demand path A-H, a path is designed, which passes through the connection between the ports P0 and P7.
4. For the demand path A-I, a path is designed, which passes through the connection between the ports P0 and P8.
5. For the demand path A-J, a path cannot be designed since the limit to the number of connections of the port P0 is violated.
6. The optical network designing device calculates the demand path A-J so that the demand path passes through any of the existing connections that are already set according to the aforementioned items 1 to 5. Since a route (detour) of the demand path A-J (detour) is not present in the aforementioned existing connections illustrated in FIG. 12, the optical network designing device determines cannot be designed.
7. The optical network designing device searches the demand path A-J so that the demand path passes through a connection other than the existing connections. The optical network designing device calculates the connection between the ports P0 and P9 as a connection of the demand path A-J that passes through the optical hub site 55.

8. The limit to the number of connections of the port P0 is violated by setting the connection between the ports P0 and P9. The optical network designing device determines whether or not the existing connection of the demand path A-B can be removed. The optical network designing device determines that the connection of the demand path A-B cannot be removed since a detour of the demand path A-B is not present.

9. The optical network designing device determines whether or not the existing connection of the demand path A-C can be removed. The optical network designing device determines that the connection of the demand path A-C cannot be removed since a detour of the demand path A-C is not present.

10. The optical network designing device determines whether or not the existing connection of the demand path A-H can be removed. Since the optical hub sites H and I have the connection relationship, the connection of the demand path A-H can be replaced with the connection of the demand path A-I. Thus, in the optical hub site 55, the connection of the demand path A-H is removed and the connection of the demand path A-J is set so that the violation of the limit to the number of connections of the port P0 is resolved.

11. For the demand path D-H, a path is designed, which passes through the connection between the ports P3 and P7.

12. For the demand path E-H, a path is designed, which passes through the connection between the ports P4 and P7.

13. For the demand path G-H, a path is designed, which passes through the connection between the ports P6 and P7.

14. For the demand path J-H, a path is designed, which passes through the connection between the ports P9 and P7.

15. For the demand path B-I, a path is designed, which passes through the connection between the ports P1 and P8.

16. For the demand path C-I, a path is designed, which passes through the connection between the ports P2 and P8.

17. For the demand path E-I, a path is designed, which passes through the connection between the ports P4 and P8.

18. For the demand path F-I, a path cannot be designed due to a violation of the limit to the number of connections of the port P8.

19. The optical network designing device calculates the demand path F-I so that the demand path F-I passes through any of the existing connections described in the items 1 to 18. Since a route (detour) of the demand path F-I (detour) is not present in the aforementioned existing connections illustrated in FIG. 12, the optical network designing device determines that the demand path F-I cannot be designed.

20. The optical network designing device searches the demand path F-I that passes through a connection other than the existing connections. The optical network designing device calculates the connection between the ports P5 and P8 as a connection of the demand path F-I in the optical hub site 55.

21. The limit to the number of connections of the port P8 is violated by setting the connection between the ports P5 and P8. The optical network designing device determines whether or not the existing connection of the demand path A-I can be removed. The optical network designing device determines that the existing connection of the demand path A-I cannot be removed since the demand path A-I is already set as the detour of the demand path A-H.

22. The optical network designing device determines whether or not the existing connection of the demand path B-I can be removed. The optical network designing device determines that the existing connection of the demand path B-I cannot be removed since a detour of the demand path B-I is not present.

23. The optical network designing device determines whether or not the existing connection of the demand path C-I can be removed. The optical network designing device determines that the existing connection of the demand path C-I cannot be removed since a detour of the demand path C-I is not present.

24. The optical network designing device determines whether or not the existing connection of the demand path E-I can be removed. Since the optical hub sites H and I have the connection relationship, the connection of the demand path E-I can be replaced with the connection of the demand path E-H. Thus, in the optical hub site 55, the connection of the demand path E-I is removed and the connection of the demand path F-I is set so that the violation of the limit to the number of connections of the port P8 is resolved.

In this manner, in the method for determining a violation of a limit to the number of connections for each calculation of a single demand path, the calculation using Dijkstra's algorithm is performed 24 times.

On the other hand, the optical network designing device 10 that designs a demand path without consideration of a violation of a limit to the number of connections and selects a connection to be removed after the path design designs demand paths by performing the calculation using Dijkstra's algorithm 16 times. Therefore, in the optical network designing device 10, it is possible to reduce a calculation time.

FIG. 15 is a diagram illustrating a comparison of the numbers of calculations to search paths. FIG. 15 illustrates the number of calculations that are performed to design paths without consideration of a violation of a limit to the number of connections, select a removal connection and search a path as described with reference to FIG. 11 and the like. FIG. 15 also illustrates the number of calculations that are performed to search demand paths on a demand path basis in consideration of a violation of a limit to the number of connections as described with reference to FIG. 14. In FIG. 15, the numbers of calculations to search a path is the numbers of calculations using Dijkstra's algorithm.

In a field for "the number of calculations for demand path setting" as illustrated in FIG. 15, the number of calculations using Dijkstra's algorithm in operation S2 of FIG. 11 and the number of calculations using Dijkstra's algorithm in operations S12, S14 and S16 of FIG. 14 are indicated.

In FIG. 15, "D" is the total number of demand paths. In the method for calculating a path as described with reference to FIG. 11 and the like, a demand path is designed without consideration of a violation of a limit to the number of connections. Thus, "the number of calculations for demand path setting" is D. On the other hand, in the method for calculating a path as described with reference to FIG. 14, since Dijkstra's algorithm is executed in the three operations S12, S14 and S16, "the number of calculations for demand path setting" is 3×D.

In a field for "the number of calculations with adjustment of connections" as illustrated in FIG. 15, the number of calculations using Dijkstra's algorithm in operation S7 of FIG. 11 and the number of calculations using Dijkstra's algorithm in operation S21 of FIG. 14 are indicated.

In FIG. 15, "N" is the total number of A-Hubs that form an optical network, and "$C_{new}$" is the number of connections to be removed by the process illustrated in FIG. 11. In other words, "$C_{new}$" is the number of calculations using Dijkstra's algorithm in operation S7 that is repeated by operations S5a and S5b of FIG. 11. In addition, "$C_{Cnew}$" is the number of demand paths that belong to a connection to be removed by the process illustrated in FIG. 11. In other words, "$C_{Cnew}$" is the number of calculations using Dijkstra's algorithm in operation S7 that is repeated by operations S6a and S6b of FIG. 11. Therefore, "the number of calculations with adjustment of connections" is $N \times C_{new} \times C_{Cnew}$.

In FIG. 15, "$C_{old}$" is the number of connections to be removed by the process illustrated in FIG. 14. In other words, "$C_{old}$" is the number of calculations using Dijkstra's algorithm in operation S21 that is repeated by operations S19a and S19b of FIG. 14. In addition, "$C_{Cold}$" is the number of demand paths that belong to a connection to be removed by the process illustrated in FIG. 14. In other words, "$C_{Cold}$" is the number of calculations using Dijkstra's algorithm in operation S21 that is repeated by operations S20a and S20b of FIG. 14. Therefore, "the number of calculations with adjustment of connections" is $D \times N \times C_{old} \times C_{Cold}$.

As indicated by "the number of calculations for set demand paths" as illustrated in FIG. 15, the number of calculations that are performed by the optical network designing device 10 described with reference to FIG. 11 and the like is one third of the number of calculations that are performed in the path searching method described with reference to FIG. 14.

In addition, "$C_{new}$" and "$C_{old}$" each indicate the number of removal connections and are equal to each other. Furthermore, "$C_{Cnew}$" and "$C_{Cold}$" each indicate the number of demand paths belonging to a removal connection and are equal to each other. Thus, as indicated by "the number of calculations with adjustment of connections" as illustrated in FIG. 15, the number of calculations that are performed by the optical network designing device 10 described with reference to FIG. 11 and the like is 1/D of the number of calculations that are performed in the path searching method described with reference to FIG. 14. It is, therefore, possible to reduce a calculation time in the method for determining a violation of a limit to the number of connections for each calculation of a single demand path in the optical network designing device 10.

As described above, the optical network designing device 10 calculates a demand path requested by the operator without consideration of a limit to the number of connections of an A-Hub and determines whether or not the limit to the number of connections is violated in the A-Hub through which the calculated path passes. Then, the optical network designing device 10 selects a connection to be removed from the A-Hub and recalculates the demand path. Thus, the optical network designing device 10 can design a path of an optical network even when the size of the optical network is increased. In addition, it is possible to reduce a calculation time in the method for determining a violation of a limit to the number of connections for each calculation of a single demand path in the optical network designing device 10.

The aforementioned processing function can be achieved by a computer. In this case, a program in which information on a process that is performed by the function of the optical network designing device is described is provided. The aforementioned processing function is achieved on the computer by causing the computer to execute the program. The program in which the process information is described can be stored in a computer-readable storage medium. As the computer-readable storage medium, a magnetic storage device, an optical disc, a magneto-optical storage medium, a semiconductor memory or the like may be used. As the magnetic storage device, a hard disk drive (HDD), a flexible disk (FD), a magnetic tape or the like may be used. As the optical disc, a DVD, a DVD-RAM, a CD-ROM, a CD-RW or the like may be used. As the magneto-optical storage medium, a magneto-optical (MO) disk or the like may be used.

In order to distribute the program, a portable storage medium (such as a DVD or a CD-ROM) that stores the program is sold, for example. In addition, the program may be stored in a storage device of a server computer and transferred from the server computer to another computer through a network.

The computer that executes the program stores, in a storage device of the computer, the program stored in the portable storage medium or transferred from the server computer. Then, the computer reads the program from the storage device of the computer and performs the process according to the program. The computer can directly read the program from the portable storage medium and perform the process according to the program. In addition, every time the program is transferred from the server computer coupled to the network, the computer can perform the process according to the received program.

In addition, at least a part of the aforementioned processing function can be achieved by an electronic circuit such as a digital signal processor (DSP), an application specific integrated circuit (ASIC) or a programmable logic device (PLD).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical network designing device that designs a path of an optical network that includes an asymmetric optical hub site, comprising:
   a memory; and
   a processor coupled to the memory and configured to execute a process, the process including:
   calculating a requested traffic path without a limit to a number of connections of the asymmetric optical hub site;
   determining whether a limit to the number of connections is violated in the asymmetric optical hub site through which the traffic path calculated by the calculating passes;
   selecting a removal connection to be removed from the determined asymmetric optical hub site when it is determined by the determining that the limit to the number of connections is violated; and
   calculating a traffic path that passes through the asymmetric optical hub site from which the removal connection selected by the selecting has been removed;
   wherein the selecting selects, as the removal connection on a priority basis, a connection between ports that each have more than the limit to the number of connections and are included in the asymmetric optical hub site.

2. The optical network designing device according to claim 1,
   wherein when a plurality of removal connections selected on a priority basis are present, the selecting selects, as the removal connection on a priority basis, a connection between ports whose total allowable number of connections is larger.

3. The optical network designing device according to claim 1,
   wherein when a plurality of removal connections between ports whose total numbers of excess connections are equal to each other are present, the selecting selects, as the removal connection on a priority basis, a connection to which a smaller number of traffic paths belong.

4. The optical network designing device according to claim 1,
wherein when a connection between ports that each have more than the limit to the number of connections is not present, the selecting selects, as the removal connection on a priority basis, a connection between a certain port that has more than the limit to the number of connections and a port that is located on the opposite side of the certain port and whose allowable number of connections is smaller.

5. The optical network designing device according to claim 4,
wherein when a plurality of removal connections between ports whose total allowable numbers of connections are equal to each other are present, the selecting selects, as the removal connection on a priority basis, a connection to which a smaller number of traffic paths belong.

6. The optical network designing device according to claim 1,
wherein the calculating a traffic path weights a connection that remains in the asymmetric optical hub site after the removal of the removal connection and calculates a traffic path.

7. The optical network designing device according to claim 6,
wherein the calculating a traffic path performs the weighting so that a usable connection that does not cause a violation of the limit to the number of connections is prioritized over a connection used by the traffic path calculated by the calculating and is selected for a traffic path.

8. The optical network designing device according to claim 7,
wherein the calculating a traffic path weights the usable connection on the basis of allowable numbers of connections of ports between which the usable connection can be established.

9. The optical network designing device according to claim 7,
wherein the calculating a traffic path weights the used connection so that a connection to which a smaller number of traffic paths belong is selected on a priority basis.

10. An optical network designing method that is performed by an optical network designing device that designs a path of an optical network that includes an asymmetric optical hub site, comprising:
calculating a requested traffic path without a limit to a number of connections of the asymmetric optical hub site;
determining whether a limit to the number of connections of the asymmetric optical hub site through which the calculated traffic path passes is violated;
selecting a removal connection to be removed from the determined asymmetric optical hub site when it is determined that the limit to the number of connections is violated; and
calculating a traffic path that passes through the asymmetric optical hub site from which the selected removal connection has been removed;
wherein the selecting selects, as the removal connection on a priority basis, a connection between ports that each have more than the limit to the number of connections and are included in the asymmetric optical hub site.

11. A non-transitory storage medium that stores an optical network designing program that causes a computer to perform a process for designing a path of an optical network that includes an asymmetric optical hub site, the process comprising:
calculating a requested traffic path without a limit to a number of connections of the asymmetric optical hub site and storing the calculated traffic path in a path information storage unit;
determining whether a limit to the number of connections of the asymmetric optical hub site through which the traffic path stored in the path information storage unit passes is violated;
selecting a removal connection to be removed from the asymmetric optical hub site when the determining determines that the limit to the number of connections is violated; and
calculating a traffic path that passes through the asymmetric optical hub site from which the selected removal connection has been removed;
wherein the selecting selects, as the removal connection on a priority basis, a connection between ports that each have more than the limit to the number of connections and are included in the asymmetric optical hub site.

* * * * *